United States Patent [19]
Cook

[11] 3,809,982
[45] May 7, 1974

[54] CENTRIFUGE SPEED CONTROL

[75] Inventor: Kenneth J. Cook, Oak Park, Mich.

[73] Assignee: William Beaumont Hospital, Royal Oak, Mich.

[22] Filed: Mar. 5, 1973

[21] Appl. No.: 337,956

[52] U.S. Cl. .............................. 318/313, 318/327
[51] Int. Cl. .............................................. H02p 5/16
[58] Field of Search .......... 318/313, 326, 327, 328, 318/341, 345

[56] References Cited
UNITED STATES PATENTS

| | | | |
|---|---|---|---|
| 3,510,742 | 5/1970 | Pooley | 318/313 |
| 3,328,662 | 6/1967 | Gambill | 318/327 |
| 3,414,790 | 12/1968 | Auld | 318/313 |
| 3,582,744 | 6/1971 | Coffey | 318/313 |
| 3,660,752 | 5/1972 | Pfeffer | 318/313 |

*Primary Examiner*—Bernard A. Gilheany
*Assistant Examiner*—Thomas Langer

[57] ABSTRACT

An electro-optical system for measuring and controlling the rotational speed of a centrifuge. The rotational speed is optically sensed and converted into an electrical signal for comparison with a signal indicative of the desired speed. The result of the comparison is optically coupled to control the occurrence and duration of a signal to a motor which rotates the centrifuge. The optical coupling electrically isolates the centrifuge from the measuring system. An optional digital readout may be utilized to indicate rotational speed.

5 Claims, 7 Drawing Figures

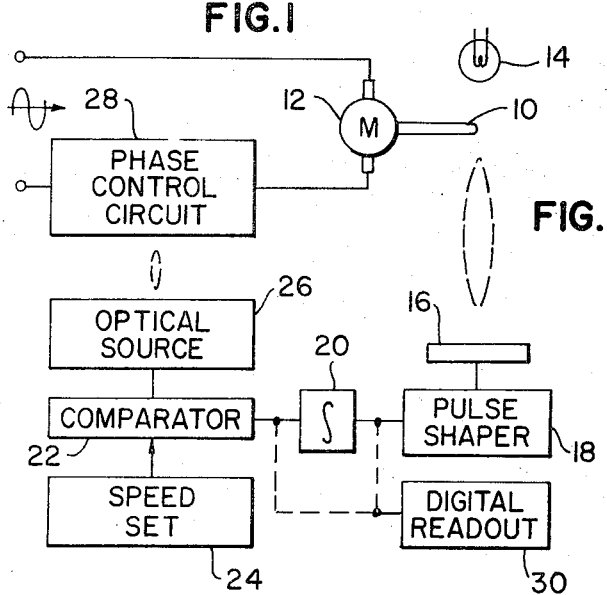
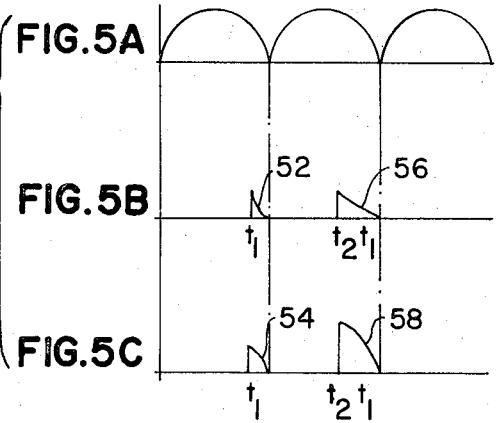
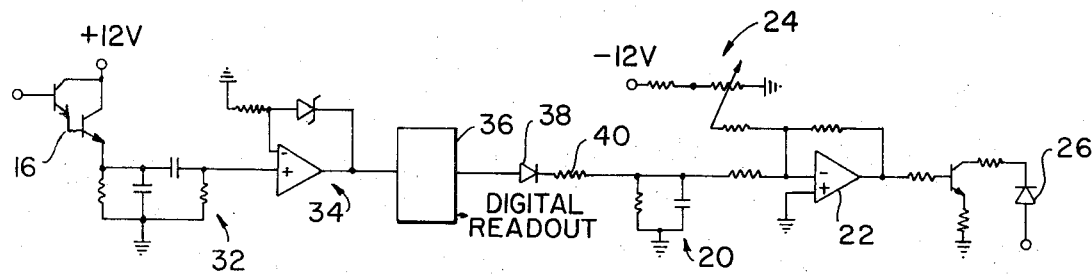
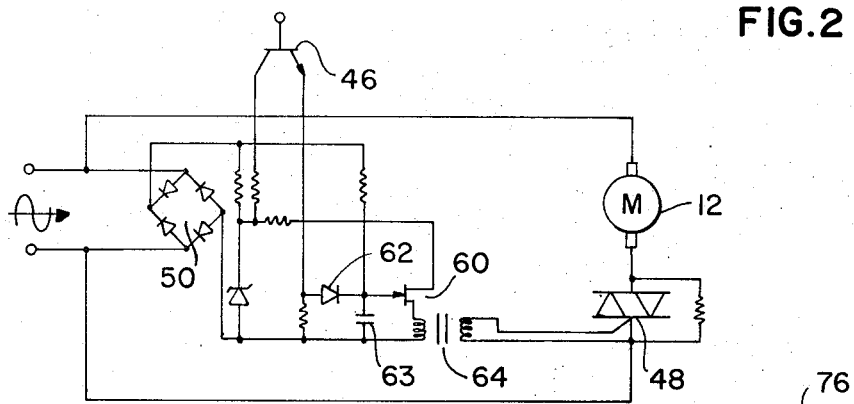
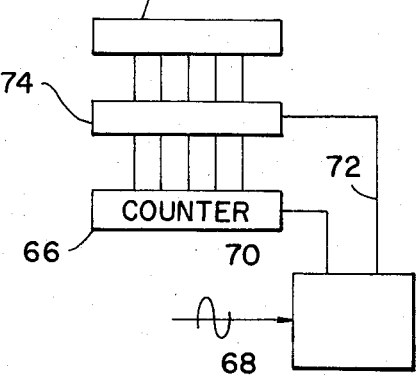

CENTRIFUGE SPEED CONTROL

BACKGROUND OF THE INVENTION

This invention relates generally to a speed control system for a centrifuge. More particularly, this invention relates to a centrifuge control system which is electrically isolated from the centrifuge itself.

It is often important and necessary to accurately control the speed of a centrifuge. This may be expected in medical environments, for example, where it is necessary to repeat a particular test with full knowledge that the centrifuge will operate at the same speed each time.

Controlling the speed of a centrifuge is particularly difficult when the articles being separated vary in size and density or when all the centrifuge buckets are not full. The varying sizes can cause an imbalance with a resulting speed variation within a centrifuge. In addition, as the separating takes place within each tube of a centrifuge, the heavier material moving towards the bottom of the tubes will result in a greater centrifugal force acting to slow down the centrifuge.

Centrifuges having an accurate speed control apparatus are extremely expensive. Thus it is not economically feasible to include accurate speed control on less expensive centrifuges. Although less expensive centrifuges include a rheostat to limit current as a form of speed control, this is a relatively inaccurate solution and does not protect against line surges.

Therefore, it is an important object of the present invention to provide a relatively inexpensive system for measuring and controlling the speed of a centrifuge.

It is a further object of the present invention to provide a measuring and control system which may be conveniently attached to an existing centrifuge.

BRIEF DESCRIPTION OF THE DRAWINGS

The foregoing objects of the present invention, together with the other objects and advantages which may be attained by its use, will become more apparent upon reading the following detailed description taken in conjunction with the drawings.

In the drawings, wherein like numerals identify corresponding parts:

FIG. 1 is a block diagram of a system for measuring and controlling the rotational speed of a centrifuge, according to the principles of the present invention;

FIG. 2 is a schematic circuit diagram of the measuring and sensing portion of the present invention;

FIG. 3 is a schematic circuit diagram of the control portion of the present invention;

FIG. 4 is a block diagram of a display apparatus for use with the present invention; and FIG. 5, comprising FIGS. 5a, 5b and 5c, is a diagram of the wave forms for the control circuit of the present invention.

DETAILED DESCRIPTION OF THE INVENTION

Referring to the drawings, there is illustrated a bucket 10 of a conventional centrifuge which is rotated by a motor 12. A light source 14 which may be conveniently mounted within the shell of the centrifuge, emits light which is reflected off the buckets and back to a photoresponsive device such as a phototransistor 16. As the centrifuge rotates, each bucket reflects light which increases the conductivity of the transistor 16 and each such increase results in a pulse from the transistor. Thus, the speed of the centrifuge is measured optically and coupled optically to a phototransistor 16 which emits a stream of pulses indicative of the centrifuge speed.

The output of the phototransistor is coupled to an amplifier and shaper 18 which provides a stream of pulses having a frequency proportional to the rotational speed of the centrifuge.

The pulse stream coming from the amplifier and shaper 18 is fed to an integrater or averaging network 20 to provide a D.C. voltage which serves as one input to a comparator 22. The input to the comparator is biased by a D.C. voltage which is manually adjustable based upon the desired rotational speed. This D.C. voltage comes from a speed set or control 24.

The output of the comparator 22, commonly called the error signal since it reflects a difference in speed between the desired speed and the actual speed, is connected to an optical source 26. The optical source provides a signal having an intensity which varies based upon the strength of the error signal. The output of the optical source 26 is picked up by a phase control circuit 28 and converted into signal which regulates the phase and duration of voltage applied to the motor 12.

Also included in a block diagram of FIG. 1 is a display or readout means 30 which may be coupled to either the output of the integrator 20 or the output of the amplifier and pulse shaper 18.

In the operation of centrifuges, it is desired not to put additional loading on the power supply as this may affect the rotational speed of the centrifuge. For this reason, the centrifuge itself is electrically isolated from the measuring and control circuit. This electrical isolation is accomplished by optical coupling at both the speed sensing portion of the circuit and the control portion of the circuit as will be explained in greater detail.

Referring next to FIG. 2, a circuit for carrying out the above mentioned functions will now be explained. The phototransistor 16 may be a 2N5780 NPN type having a positive 12 volts connected to its collector and having its emitter connected to ground through a resistor-capacitor network 32. The network 32 includes two 1 Kohm parallel resistors having one side grounded, a .005 uf capacitor having one side grounded and a .01 uf coupling capacitor.

The output of the phototransistor 16 serves as the input to the positive terminal of an amplifier 34, which may be of the type such as a Fairchild 741 integrated circuit package having a 1N4743 zener diode in its feedback loop. The output of the amplifier 34 may be gated into a pulse shaper 36 which in a preferred embodiment may be an appropriately biased monostable multivibrator such as a Fairchild 74-121.

For convenience, the multivibrator is shown as having two outputs, one of which may be coupled to a digital readout. The other output of the multivibrator is connected through a 1N914A diode 38 and a 1Kohm resistor 40 to an integrating network 20.

The integrating network 20, which may be a 1Kohm resistor and a 200 uf capacitor, provides a D.C. output which serves as one input to the comparator 22 such as a Fairchild 741. This input is part of a voltage divider network having as its other part the speed control 24. Thus, if the D.C. voltage from the integrator network equals the voltage developed across the speed control there will be no input to the comparator.

The output of the comparator 22, called the error signal, is coupled to an optical source 26, such as a light emitting diode for optical coupling back to the motor control. The light emitting diode may be part of a Fairchild optical coupler style FPLA810.

Referring next to FIG. 3, the speed control of the present invention is illustrated including a photosensitive transistor 46 which may be part of the optical coupling FPLA810. In commercial applications, the light emitting diode and the light sensitive transistor 46 are sold as a complete package to provide electrical isolation.

The motor 12 is connected through a triac 48 to the line voltage. Thus the firing of the triac couples power to the motor as is conventional. The incoming line voltage is full-wave rectified, by diode rectifier 50, to provide the waveform of FIG. 5a. Within each cycle if the triac 48 is turned on at time $t_1$, as illustrated by the waveform 52 of FIG. 5b, the voltage to the motor 12 from the line voltage takes on the waveform 54 of FIG. 5c.

If, however, the triac 48 is turned on earlier in each cycle, such as at time $t_2$ resulting in a waveform 56 of FIG. 5b, the voltage to the motor is of greater duration as illustrated in 58 of FIG. 5c.

Thus, if the motor should be moving too slow, it will be desired to turn on the triac sooner during each cycle, i.e., $t_2$ rather than $t_1$. Therefore, it may be said that there is a phase shift or phase delay between the start of each cycle of line voltage and the turning on of the triac. The shorter this delay, the greater voltage is applied to the motor. The longer the delay or greater the phase shift, the lesser voltage is applied through the triac to the motor.

With this background, FIG. 3 illustrates a phase shift network responsive to the optical coupling from the error output signal of the comparator 22 of FIG. 2. FIG. 3 includes a full wave diode rectifier 50 which couples pulsating D.C. to the base of a unijunction transistor or UJT 60, to the RC timing circuit, and to the collector of the photo transistor 46, which supplies a current through diode 62 to the emitter of the UJT 60.

The current from the transistor 46 changes the magnitude of the rectified voltage applied to the RC circuit which is connected to the emitter of the UJT from the rectifier 50. Thus, the current from the transistor 46 operates to decrease the charge time of the capacitor 63 connected to the emitter of the UJT.

The intensity of light emitted by the optical source or light emitting diode 26 controls the strength of the signal from the transistor 46 and thus the magnitude of the signal to the emitter of the UJT 60. The magnitude of this signal permits the UJT to conduct. When the UJT conducts, the current from the emitter to the base electrode is coupled by a transformer 64 to the triac 48.

With reference to FIG. 4, there is illustrated a digital display or readout which provides a display based upon the frequency of pulses from the amplifier and shaper 18. A counter 66 counts the pulses from the amplifier and shaper 18 and this counting is synchronized by a timer 68 which may be connected to the line voltage.

The timer 68 provides a reset pulse along lead 70 and a strobe pulse along lead 72 to a storage element 74 such as a Motorola MC 4051P. In operation as the counter 66 is reset, it counts pulses until the next reset pulse at which time the value is moved into storage 74. Upon the occurrence of a strobe pulse along lead 72, the output of the storage 74 is utilized to control a multidigit display panel 76 such as a Fairchild FND70.

The foregoing is a description of one embodiment of the present invention and should not be read in the restrictive sense but only as explaining the underlying concepts. The invention may be further developed within the scope of the following claims.

What is claimed is:

1. A system for controlling the rotational speed of a centrifuge, said centrifuge having a plurality of buckets and a motor for rotating said buckets, comprising:
   photo-responsive means for optically sensing the speed of the centrifuge by responding to reflections of light directly from the rotating buckets of the centrifuge;
   means for comparing the output of said photo-responsive means with a preselected voltage representing the desired speed of said buckets;
   phase shift control means for regulating the voltage to said centrifuge motor; and
   means for optically coupling the output of said comparing means to said phase shift control means while electrically isolated therefrom;
   said phase shift control means including:
   a rectifier for coupling a full wave rectified D.C. signal to a base of a unijunction transistor, the unijunction transistor for switching from a nonconductive state to a conductive state for turning on the voltage to said motor; and
   a capacitor coupled to the emitter of said unijunction transistor and receiving a charging voltage from said optical coupling means, the intensity of the output from said optical coupling means controlling the charging time of said capacitor and thereby switching said unijunction transistor into a conducting state at the appropriate phase of each wave from said rectifier to regulate the duration of voltage to said motor during each rectifier wave.

2. The apparatus of claim 1 wherein said comparing means includes:
   pulse shaping means coupled to the output of said optical sensing means;
   pulse integrating means; and
   a comparator having the output of said integraing means and in indication of said predetermined speed coupled thereto.

3. The apparatus of claim 1 wherein said optical coupling means includes a light emitting diode for transferring signals from said comparing means to said phase shift means.

4. The apparatus of claim 1 and further including means for providing a visual indication of said optically sensed speed.

5. The apparatus of claim 1 wherein said visual indication is a digital readout.

* * * * *